May 29, 1962 C. B. CONKLIN 3,036,618
ANTI-SKID TIRE CHAIN
Filed April 13, 1961
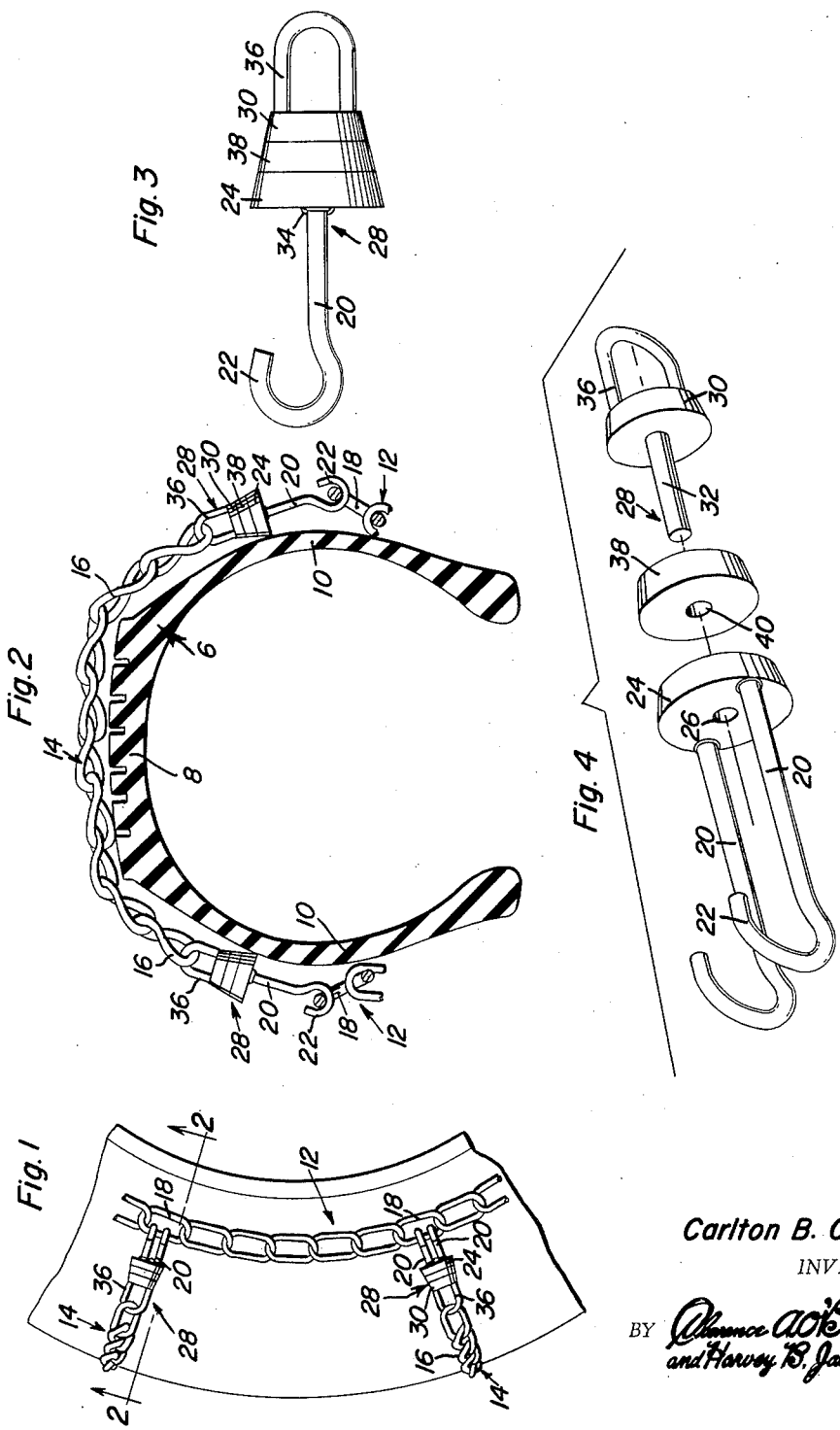
Carlton B. Conklin
INVENTOR.

United States Patent Office 3,036,618
Patented May 29, 1962

3,036,618
ANTI-SKID TIRE CHAIN
Carlton B. Conklin, R.D. 1, Van Wagner Road,
Poughkeepsie, N.Y.
Filed Apr. 13, 1961, Ser. No. 102,891
5 Claims. (Cl. 152—241)

This invention relates to an improved anti-skid traction chain for use on a vehicle tire and has to do with a chain construction which comprises a pair of circumferential side chains adapted for location at opposite sides of the tire, and a plurality of complemental cross chains which extend transversely across the tread of the tire and have their ends connected with links of the side chains, said cross chains being located at spaced intervals around the circumference or tread of the tire.

One improvement has to do with cross chains which are unique in that they are readily connectible with and detachable from the side chains, whereby to cope with the often recurring problem of having to replace cross chains which have become defective or otherwise impaired and incapable of performing their intended useful purposes.

Another improvement pertains to a novel cross chain which, in appearance and purpose corresponds to regularly used cross chains but is distinctively different by reason of the fact that the terminal ends are equipped with simple, efficient and practical means characterized by distinctively new hook means which enables the said terminal ends to be separably, but reliably, connected to prescribed links of the side chains, making it an easy matter to apply and remove the cross chains.

More specifically, novelty is predicated on an improved cross chain having twisted 8-shaped interconnected links, the endmost links provided with specially constructed swivelly mounted attaching hooks, whereby the cross chain may roll axially. This construction and arrangement is desirable in that the links will wear evenly, undue twisting and attending stresses and strains will be minimized, breakage reduced, the life of the chain increased, and better traction will be had. Then, too, tire damage will be lessened by reducing the likelihood of pinching and scuffing.

In addition to the above it is to be appreciated that the hook means at each end of the cross chains is such that the links of the tread or cross chains do not hit the ground in a parallel pattern. This assures better traction and helps to prevent side sway on the straight-away as well as on corners. This beneficial action will also improve the ride by reducing vibration at lower speeds and, then too, objectionable noise is eliminated.

In carrying out a preferred embodiment of the invention, and as will be hereinafter more fully appreciated, the swivel device or means at each end of the cross chain comprises a pair of duplicate companion hook members arranged in close spaced parallel relation and coplanar, each member embodying a shank having a hook at its outer free end, a disk-like centrally apertured first head to one side of which the shanks are joined on diametrically opposite sides of the aperture, a swivel-pin peened to said head and freely rotatable in the aperture, a second head to which said pin is axially joined, and a clevis fixed to said second head and connected with an adjacent cooperating end-link of the cross chain.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a fragmentary side elevational view showing a portion of a pneumatic automobile or vehicle tire, a portion of one side chain, adjacent ends of a pair of spaced-apart cross chains and illustrating the novel and improved cross chain connecting means;

FIGURE 2 is an enlarged view taken on the cross-section line 2—2 of FIGURE 1 looking in the direction of the arrows;

FIGURE 3 is a side elevational view of one of the swivel devices; and

FIGURE 4 is a view in perspective of the device with the component parts exploded to illustrate the detailed construction thereof.

In FIGURE 2 the pneumatic vehicle or automobile tire is conventional and denoted generally by the numeral 6 and comprises a casing having a tread portion 8 and opposed duplicate side walls 10. The circumferential side chains, which are conventional, are designated generally by the numeral 12. Each transverse cross chain or tread chain is the same in construction and a description of one will suffice for all. To this end the cross chain is designated generally by the numeral 14 and is made up principally of interconnected links. The links are preferably of twisted 8-shaped form as denoted at 16. The chain-end connecting and swivelling means which affords a linking connection between the cross chains and side chains is the same at each end. Generally speaking this means is characterized by component parts swivelly joined with one part connected to the end link of the cross chain and the other part detachably connected to a cooperating link 18 of the side chain. Specifically, two hook members are employed and each comprises a shank 20, the free end portions of the shanks terminating in open bill attaching and retaining hooks 22. The hooks are detachably connected with the link 18 as illustrated in FIGURE 2. The coplanar shanks are integrated by a spacing and connecting head which preferably comprises a disk-like rigid member 24 having an axial stud or pin hole 26 therein. The overall assembled device or means is designated by the numeral 28 and the component part which is connected to the cross chain also comprises a head 30 which is similar to the head 24 and is provided centrally on one side with an axially projecting stud or pin 32 which passes through the hole 26 and has its terminal end peened or otherwise joined as at 34 to the head 24. The head 30 is provided on the opposite side with a rigid link which is here referred to as either U-shaped or as a clevis 36. This clevis is connected to a cooperating end link in the manner shown in FIGURES 1 and 2. By preference a washer 38 is provided and this is sandwiched or interposed between the two heads 24 and 30 and the assembling and swivelling pin 32 passes through the hole 40 therein thus assembling the several components 24, 38 and 30 which in turn are joined and swivelly connected by the stud or pin 32 passing through the holes 40 and 26 in what is believed to be an obvious manner. With this construction the swivel devices 28 are permanently joined to the end links of the cross chain. In turn they are separably or detachably connected to the side chains by way of the readily connectible and releasable hooks 22.

It is believed that the instant invention constitutes a noteworthy advance in the art to which it relates. It is the utmost in simplicity and, compared to other and competitive devices, it is easier to repair and the repair work can be expeditiously and satisfactorily done. There are no weak points or catches or other components that are susceptible of easy breakage. The swivel means insures less strain on the companion interconnected links of the cross chain with the result that the cross chain in each instance is not only constantly reliable and affords good traction but should last for a long time. When traveling at relatively slow speeds noise found in other competitive devices is reduced to a relative minimum. In addition the cross chains, as they fall and strike the ground, do not fall parallel to each other. Actually this is believed to be an excellent safety factor in that it prevents the cross chains from acting as runners (as on a sled). Regular or conventional type cross chains cause an automobile to skid sideways more readily. With the instant invention the manner in which the links of the cross chains coact with each other and the manner in which the respective cross chains function as units permits this invention to satisfactorily achieve the desired end results while at the same time reducing the likelihood of skidding sideways to an appreciable minimum.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in conjunction with a pair of circumferential side chains having interconnected links; a cross chain embodying interconnected tread links, means for connecting each end of said cross chain to a coacting link of one of the side chains, said means embodying a pair of duplicate companion hook members arranged in close spaced parallel relation and coplanar, each hook member embodying shanks having hooks at their outer free ends, a centrally apertured first head to one side of which the shanks are joined, a swivel-pin peened to said head and freely rotatable in the aperture, a second head to which said pin is axially joined, and a clevis fixed to said second head and connected with an adjacent cooperating end-link of the cross chain.

2. The structure defined in claim 1, and a washer interposed between said heads and encircling said pin, said heads and washer being circular and cooperating in axial alignment.

3. For use in detachably and swivelly connecting a terminal end of a cross chain to an intended link of a cooperating circumferential side chain, connector means comprising a first unit embodying a rigid circular head having an axial hole passing therethrough and provided on one side with a pair of spaced linearly straight coplanar parallel shanks, said shanks being of a corresponding length and having free outer ends terminating in spaced parallel open-bill link connecting hooks, a washer superimposed upon the other side of said head and in line with said head, having its hole aligned with the hole in the head, a second head in line with the first head and washer and provided on one side with an axial swivel-pin, said swivel-pin passing through the hole in the washer and also the hole in the first named head and having a free end which is peened against the first head thus swivelly connecting said heads together, said second head being provided on the side opposite said swivel-pin with a clevis, said clevis being rigid and adapted to be connected to the aforementioned cross chain.

4. The structure defined in claim 3 and wherein said washer is sandwiched between adjacent opposed faces of the heads, said washer being of a diameter slightly less than the diameter of the first head and said second head being of a diameter slightly less than the diameter of said washer.

5. An anti-skid traction chain comprising, in combination, a pair of circumferential side chains for customary location at opposite circumferential sides of a vehicle tire, at least one cross chain arranged between corresponding portions of said side chains, a hook member embodying a rigid shank with a constantly open hook at the terminal end of said shank, a head fixed to the inner end of said shank, a clevis connected with an end link of said cross chain, and means swively joining said clevis with said head, said means comprising a second head having a rigid axial pin, said heads being of circular disk-like form, the first-named head having an axial hole therethrough, and said pin extending through the hole and retentively connected with a cooperating surface of said first head.

References Cited in the file of this patent

UNITED STATES PATENTS

| | | |
|---|---|---|
| 1,358,815 | Barrell | Nov. 16, 1920 |
| 1,817,547 | Eddy | Aug. 4, 1931 |
| 2,617,464 | Trumbull | Nov. 11, 1952 |

FOREIGN PATENTS

| | | |
|---|---|---|
| 101,350 | Australia | June 15, 1937 |